UNITED STATES PATENT OFFICE.

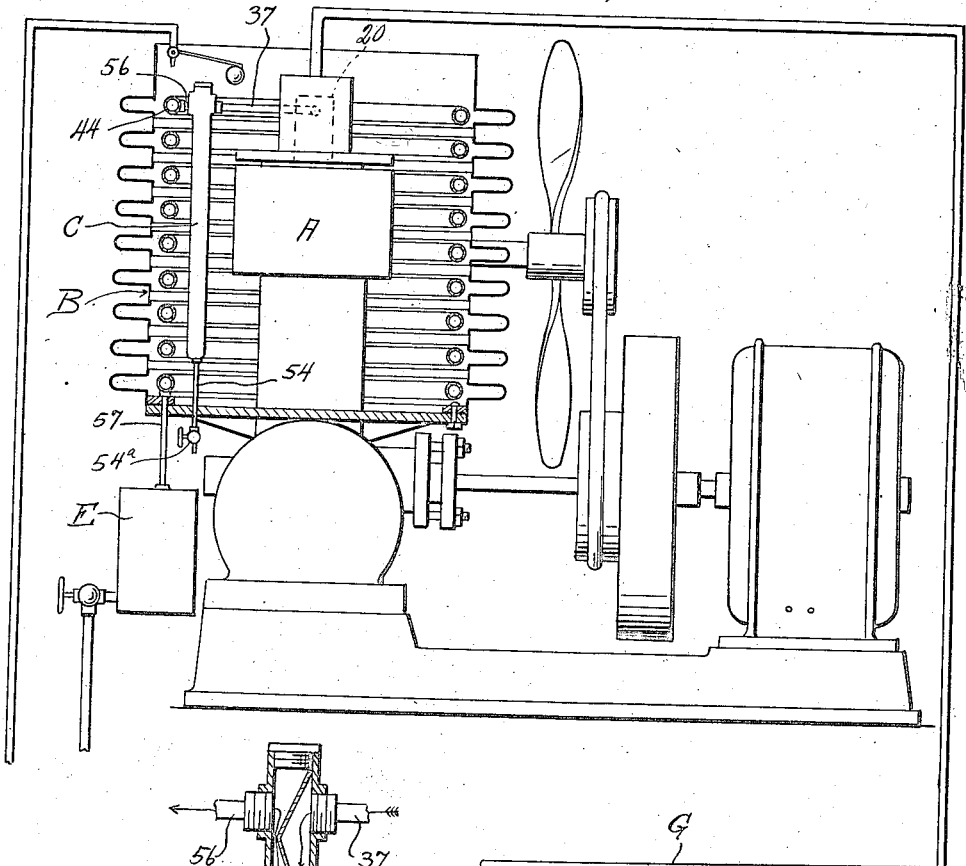

PHILIP FISCHBACHER, OF QUINCY, ILLINOIS, ASSIGNOR TO AMERICAN SANITARY REFRIGERATION CO., OF OWENSBORO, KENTUCKY, A CORPORATION OF DELAWARE.

SEPARATOR.

1,425,246.            Specification of Letters Patent.      Patented Aug. 8, 1922.

Original application filed July 30, 1919, Serial No. 314,222. Divided and this application filed July 12, 1920. Serial No. 395,488.

*To all whom it may concern:*

Be it known that I, PHILIP FISCHBACHER, a citizen of the United States, residing at Quincy, in the county of Adams and State of Illinois, have invented certain new and useful Improvements in Separators, of which the following is a specification, reference being had to the accompanying drawings.

This invention relates to refrigerating machinery, and particularly to a separator designed to be used with that form of refrigerating machinery wherein an element under pressure is allowed to expand within the refrigerating coils, is then withdrawn therefrom to a compressor and is compressed therein, and then condensed, and then passes back through the expansion or refrigerating coils, and this present application is a division of my application, Serial #314,222, filed on July 30, 1919 for refrigerating machines.

The object of the present invention is to provide an improved form of separator between a compressor and a condenser, whereby the oil and other impurities which may be carried over from the compressor to the condenser can be separated from the refrigerating agent and afterwards blown out when desired.

Other objects will appear in the course of the following description.

My invention is illustrated in the accompanying drawings, wherein:—

Figure 1 is a diagrammatic elevation of a refrigerating system, the jacket and cooling or condensing coils being shown in section;

Figure 2 is a longitudinal vertical sectional view through the separator;

In these drawings, A designated generally a compressor and B the condenser, that is a tank or jacket for holding cool water or other liquid. Disposed within this tank is a separator C, which forms the subject matter of the present application and which is illustrated in detail in Figure 2. This separator C is connected by a pipe 37 to a chamber within the head of the compressor, as is fully described in my pending application above referred to. From the upper end of the separator C extends the pipe 56 leading into a condensing coil 44. The lower end of this coil 44 is connected by a pipe 57 to the separator E. From this separator a pipe leads to an expansion regulator (not shown) which forms the subject matter of a separate application for patent. From the expansion regulator a pipe leads into the cooling coils G, and from thence a pipe leads back to the chamber 20 in the head of the condenser. I have illustrated these parts diagrammatically in Figure 1, but they are illustrated in detail in my pending applications.

The separator comprises a vertically extending, tubular member closed at its upper end having at its lower end a discharge pipe 54 provided with a purge valve 54ª. The interior of this separator C is divided for a portion of its length into two parts or compartments by means of a zigzag plate 55 constituting a baffle wall. This plate extends from the top of the separator nearly to the bottom thereof, and the upper end of the separator is connected to the upper end of the coil 44 by means of the pipe 56. The separator C, of course, is designed for the purpose of separating the oil from the refrigerating medium and operates in the usual manner, that is as the mixed oil and refrigerant passes downward on the right hand side of the plate 55 in Figure 2, the oil and foreign matter which is heavier than the refrigerant will gradually separate according to specific gravity and descend into the lower portion of the separator, while the refrigerant will pass around the lower end of the baffle plate 55 and up between this baffle plate and the left hand wall of the separator in Figure 2 and out through the pipe 56. This separation is assisted by the fact that the separator is disposed within the condensing tank B, the water of which is cooled by means which is disclosed in my pending application. The oil and other impurities may be removed from the separator by blowing out through the valved pipe 54. The zigzag baffle plate 55 secures the greatest possible area for separating the impurities from the discharged gases. It further tends to impede the movement of the foreign particles without impeding the movement of the fluid passing through the separator.

I claim:—

A separator of the character described comprising a vertically disposed chamber provided with a vertical partition extending downward from its upper end, the wall of the separator having an inlet opening at one side of the partition and an outlet opening on the other side of the partition, both of said openings being disposed adjacent the upper end of the separator, said partition being approximately zigzag in vertical cross section and having its opposite surfaces parallel and extending nearly to the lower end of the separating chamber, the crests of the zigzag partition being disposed closely adjacent to the opposite walls of the chamber whereby to impede the movement of foreign particles passing through the separator without impeding the movement of the fluid passing therethrough and whereby to bring the fluid passing through the separator into intimate contiguity with the exterior walls thereof.

In testimony whereof I hereunto affix my signature.

PHILIP FISCHBACHER.